(12) United States Patent
Li et al.

(10) Patent No.: US 9,904,399 B2
(45) Date of Patent: Feb. 27, 2018

(54) DISPLAY DEVICE HAVING PRESSURE-SENSITIVE FUNCTION AND DRIVING METHOD

(71) Applicants: BOE TECHNOLOGY GROUP CO., LTD., Beijing (CN); BEIJING BOE OPTOELECTRONICS TECHNOLOGY CO., LTD., Beijing (CN)

(72) Inventors: Changfeng Li, Beijing (CN); Shengji Yang, Beijing (CN); Xiaochuan Chen, Beijing (CN); Haisheng Wang, Beijing (CN); Xiaoliang Ding, Beijing (CN); Yingming Liu, Beijing (CN); Wei Liu, Beijing (CN); Weijie Zhao, Beijing (CN); Pengpeng Wang, Beijing (CN); Lei Wang, Beijing (CN); Pengcheng Lu, Beijing (CN)

(73) Assignees: BOE TECHNOLOGY GROUP CO., LTD., Beijing (CN); BEIJING BOE OPTOELECTRONICS TECHNOLOGY CO., LTD., Beijing (CN)

( * ) Notice: Subject to any disclaimer, the term of this patent is extended or adjusted under 35 U.S.C. 154(b) by 0 days.

(21) Appl. No.: 15/321,914

(22) PCT Filed: Jun. 29, 2016

(86) PCT No.: PCT/CN2016/087688
§ 371 (c)(1),
(2) Date: Dec. 23, 2016

(87) PCT Pub. No.: WO2017/080226
PCT Pub. Date: May 18, 2017

(65) Prior Publication Data
US 2017/0192578 A1 Jul. 6, 2017

(30) Foreign Application Priority Data

Nov. 9, 2015 (CN) .......................... 2015 1 0758107

(51) Int. Cl.
*G06F 3/041* (2006.01)
*G06F 3/044* (2006.01)

(52) U.S. Cl.
CPC ............ *G06F 3/0414* (2013.01); *G06F 3/044* (2013.01); *G06F 3/0416* (2013.01)

(58) Field of Classification Search
CPC ...... G06F 3/0414; G06F 3/0416; G06F 3/041; G06F 3/044; G06F 2203/04105; G02F 1/13338
See application file for complete search history.

(56) References Cited

U.S. PATENT DOCUMENTS 7,813,774 B2 * 10/2010 Perez-Noguera ..... G06F 3/0202
345/169
7,816,838 B2 * 10/2010 Leskinen .................. G01L 1/16
310/319

(Continued)

FOREIGN PATENT DOCUMENTS

| CN | 1773335 A | 5/2006 |
|---|---|---|
| CN | 101713878 A | 5/2010 |
| CN | 205103806 U | 3/2016 |

OTHER PUBLICATIONS

International Search Report and Written Opinion dated Sep. 29, 2016; PCT/CN2016/087688.

*Primary Examiner* — Jennifer Mehmood
*Assistant Examiner* — Sardis F Azongha
(74) *Attorney, Agent, or Firm* — Ladas & Parry LLP (57) ABSTRACT

A display device having a pressure-sensitive touch function and a driving method are provided. The display device having the pressure-sensitive touch function includes a (Continued)

display panel and a pressure-sensitive electrode, the display panel including a first electrode, a second electrode and an organic material functional layer located between the first electrode and the second electrode, which are arranged on a first base substrate, wherein, the pressure-sensitive electrode is arranged on a side of the first electrode away from the organic material functional layer, and there is a gap between the pressure-sensitive electrode and the display panel; and there is an overlapping area between a projection of the pressure-sensitive electrode and a projection of the first electrode on the first base substrate. The display device can satisfy more touch function requirement, and solve the issue of pressure-sensitive blind spots.

18 Claims, 3 Drawing Sheets

(56) References Cited

U.S. PATENT DOCUMENTS

| | | | |
|---|---|---|---|
| 9,501,195 B1* | 11/2016 | Kim | G02F 1/13338 |
| 2009/0309616 A1* | 12/2009 | Klinghult | G06F 3/044 |
| | | | 324/686 |
| 2012/0268408 A1* | 10/2012 | Chen | H04M 1/72544 |
| | | | 345/173 |
| 2016/0062500 A1* | 3/2016 | Kessler | G06F 3/0414 |
| | | | 345/174 |
| 2017/0147102 A1* | 5/2017 | Wang | G06F 3/0414 |

* cited by examiner

| In a pressure-sensitive stage, inputting a fixed voltage signal to the first electrode 20, inputting a driving signal to the pressure-sensitive electrode 50 and receiving a feedback signal, so as to acquire a touch position and a capacitance value, and obtain a pressure value according to the capacitance value | ⟵ S101 |

| Comparing the pressure value with pre-stored standard pressure ranges, in a case where the pressure value is in one of the standard pressure ranges, enabling a function of the display device 01 corresponding to the range | ⟵ S102 |

DISPLAY DEVICE HAVING PRESSURE-SENSITIVE FUNCTION AND DRIVING METHOD

TECHNICAL FIELD

Embodiments of the present disclosure relate to a display device having a pressure-sensitive function and a driving method.

BACKGROUND

With rapid development of a display technology, a touch display technology has been widely used in a variety of display products such as a mobile phone, a watch and a tablet computer and so on. An Organic Light Emitting Diode (OLED) display device has become current development trend due to characteristics such as wide viewing angle, low energy consumption and thin product and so on.

At present, in a touch display field, a pressure-sensitive function is mainly realized by arranging an additional mechanism in a display device. For example, in March 2015, Apple Inc released a touch device having a pressure-sensitive function, which realizes a function of identifying three types of light, medium and heavy pressures by arranging a gravity sensing device in each of four corners of the touch device, respectively.

However, in one aspect, only a function of identifying three types of pressures can be realized, more touch function requirements cannot be met, and user experience is insufficient; and in another aspect, when a size of the touch device is large, there may be a problem of pressure sensitive blind spots.

SUMMARY

One embodiment of the disclosure provides a display device having a pressure-sensitive touch function, comprising a display panel and a pressure-sensitive electrode, the display panel including a first electrode, a second electrode and an organic material functional layer located between the first electrode and the second electrode, which are arranged on a first base substrate, wherein, the pressure-sensitive electrode is arranged on a side of the first electrode away from the organic material functional layer, and there is a gap between the pressure-sensitive electrode and the display panel; and there is an overlapping area between a projection of the pressure-sensitive electrode and a projection of the first electrode on the first base substrate.

Another embodiment of the disclosure provides a driving method of the display device as mentioned above, comprising: in a pressure-sensitive stage, inputting a fixed voltage signal to the first electrode, inputting a driving signal to the pressure-sensitive electrode and receiving a feedback signal from the pressure-sensitive electrode, so as to acquire a touch position and a capacitance value, and obtain a pressure value according to the capacitance value; comparing the pressure value with pre-stored standard pressure ranges, in a case where the pressure value is in one of the standard pressure ranges, enabling a function of the display device corresponding to the range.

BRIEF DESCRIPTION OF THE DRAWINGS

In order to clearly illustrate the technical solution of the embodiments of the present disclosure, the drawings of the embodiments will be briefly described in the following; it is obvious that the described drawings are only related to some embodiments of the present disclosure and thus are not limitative of the present disclosure.

FIG. 1b is a cross-sectional view along an AA direction of FIG. 1a;

FIG. 2b is a cross-sectional view along a BB direction of FIG. 2a;

DETAILED DESCRIPTION

In order to make objects, technical details and advantages of the embodiments of the present disclosure apparent, the technical solutions of the embodiment will be described in a clearly and fully understandable way in connection with the drawings related to the embodiments of the present disclosure. It is obvious that the described embodiments are just a part but not all of the embodiments of the present disclosure. Based on the described embodiments herein, those ordinarily skilled in the art can obtain other embodiment(s), without any inventive work, which should be within the scope of the present disclosure.

Unless otherwise specified, the technical terms or scientific terms here should be of general meanings as understood by those skilled in the art. "First", "second" and similar words in the specification and claims of the present disclosure do not indicate any sequence, quantity or importance, but only intend to differentiate different composite parts.

Embodiments of the present disclosure provide a display device 01 having a pressure-sensitive function, and as illustrated in FIG. 1a and FIG. 1b, and FIG. 2a and FIG. 2b, the display device 01 comprises a display panel 02, and the display panel 02 includes a first electrode 20, a second electrode 40 and an organic material functional layer 30 located between the first electrode 20 and the second electrode 40, which are arranged on a first base substrate 10. The display panel 02 further includes a pressure-sensitive electrode 50; the pressure-sensitive electrode 50 is arranged on a side of the first electrode 20 away from the organic material functional layer 30, and there is a gap 60 between the pressure-sensitive electrode 50 and the display panel 02. There is an overlapping area between a projection of the pressure-sensitive electrode 50 and a projection of the first electrode 20 on the first base substrate 10.

A principle of realizing a pressure-sensitive touch is that: since there is an overlapping area between the projection of the pressure-sensitive electrode 50 and the projection of the first electrode 20 on the first base substrate 10, and there is a distance between the pressure-sensitive electrode 50 and the first electrode 20, it can be known that a capacitance (C)

may be generated between the pressure-sensitive electrode 50 and the first electrode 20 according to a parallel plate capacitance formula, i.e., $$C \propto \varepsilon \frac{S}{d},$$

where, ϵ is a constant, S is the overlapping area between the pressure-sensitive electrode 50 and the first electrode 20, and d is the distance between the pressure-sensitive electrode 50 and the first electrode 20.

On such basis, when the display device 01 is not subjected to pressure (i.e., there is no touch), since the distance between the pressure-sensitive electrode 50 and the first electrode 20 is fixed, the capacitance generated therebetween is fixed. When a certain pressure is applied to a light-outgoing side of the display device 01 by a finger, the gap 60 between the pressure-sensitive electrode 50 and the display panel 02 is reduced, so that the distance between the pressure-sensitive electrode 50 and the first electrode 20 is reduced, and it can be known that the capacitance between the pressure-sensitive electrode 50 and the first electrode 20 will be increased according to the parallel plate capacitance formula. On such basis, according to a corresponding relationship between the changed capacitance value and the pressure value, the pressure applied by the finger in a touch position may be obtained, so as to realize a corresponding touch function.

It should be noted that, firstly, the display panel 02 includes a plurality of sub-pixel units, and each sub-pixel unit includes a first electrode 20, an organic material functional layer 30 and a second electrode 40.

The organic material functional layer 30 may at least include a light-emitting layer, and on such basis, in order to improve an efficiency of injecting electrons and holes into the light-emitting layer, the organic material functional layer 30 may further include an electron transport layer, a hole transport layer and an electron injection layer arranged between a cathode and the electron transport layer, and a hole injection layer arranged between the hole transport layer and an anode.

Figure 1A:
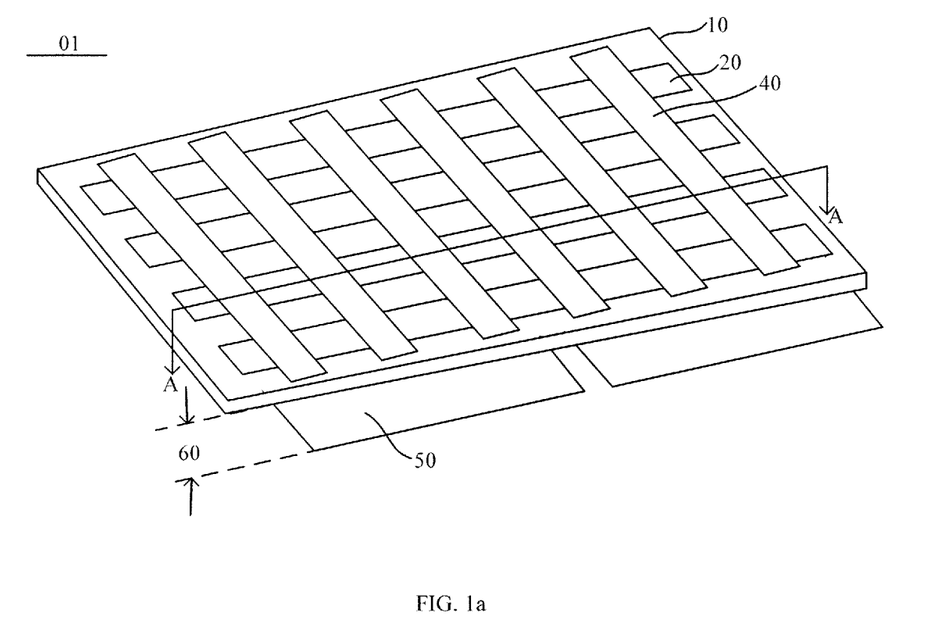
FIG. 1a is a structural schematic diagram of a display device having a pressure-sensitive function provided by an embodiment of the present disclosure.
Figure 2A:
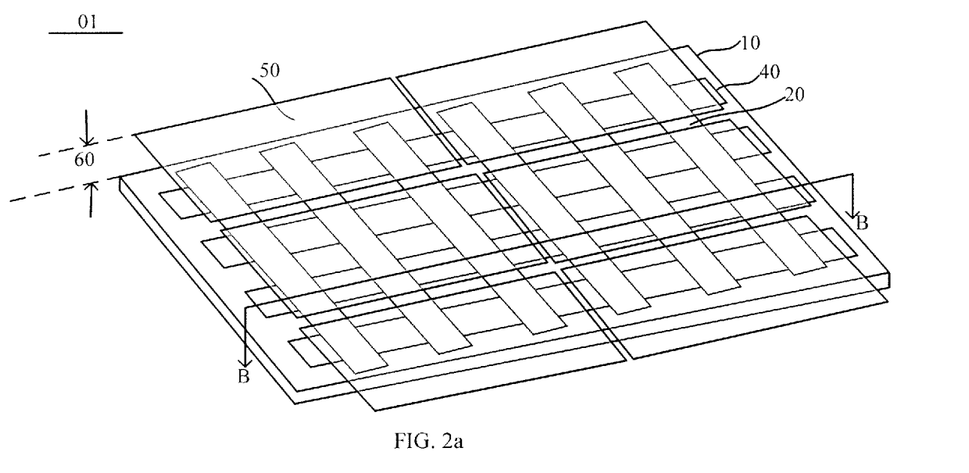
FIG. 2a is a structural schematic diagram of another display device having a pressure-sensitive function provided by an embodiment of the present disclosure.

The first electrode 20, in addition to being used for display in conjunction with the second electrode 40, is also used for cooperating with the pressure-sensitive electrode 50 to realize the pressure-sensitive function, and therefore, as illustrated in FIG. 1a and FIG. 2a, it is preferable that the first electrode 20 is a strip electrode in the embodiments of the present disclosure.

One of the first electrode 20 and the second electrode 40 may be transparent, non-transparent, or the two are transparent at the same time, which is not limited here. When it is transparent, it may be made of Indium Tin Oxides (ITO) or a metal material (as long as a thickness of the electrode is thin); when it is non-transparent, it may be made of a metal material.

In addition, a type of the display panel 02 is not limited, which may be an Active Matrix Organic Light Emitting Diode (AMOLED) display panel, or a Passive Matrix Organic Light Emitting Diode (PMOLED) display panel. As compared with the AMOLED, the PMOLED has significant advantages in application of small-sized products due to characteristics such as simple fabrication process, lower product price and so on.

Figure 1B:
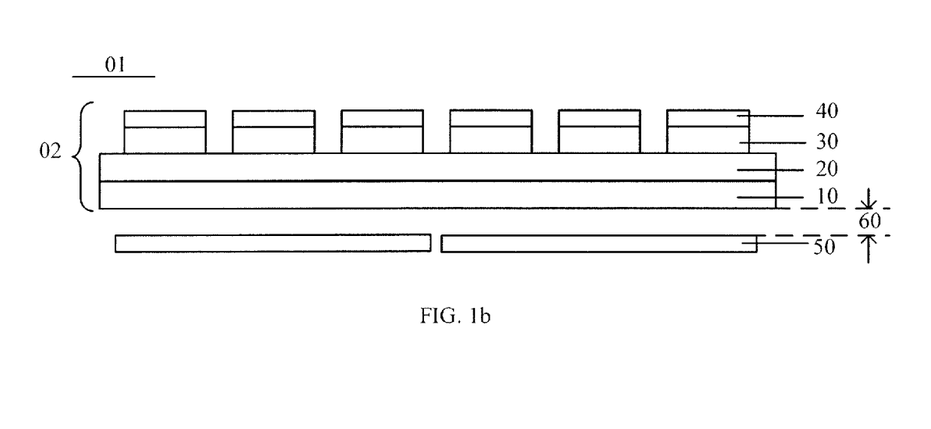
Figure 2B:
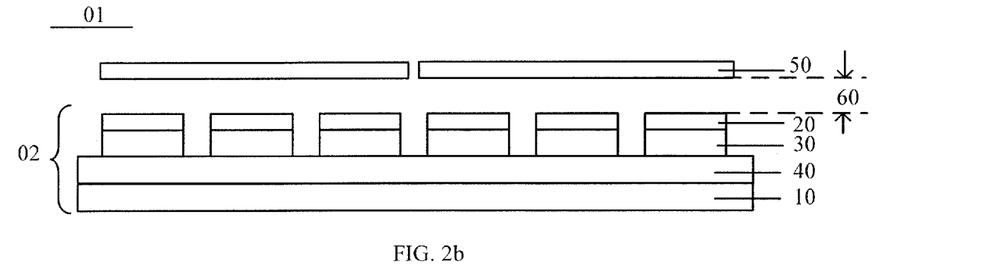

Secondly, a position for arranging the first electrode 20 is not limited, and the first electrode 20 may be arranged close to the first base substrate 10 as illustrated in FIG. 1b, or may be arranged away from the first base substrate 10 as illustrated in FIG. 2b. In other words, the first electrode may be arranged on a side of the organic material functional layer 30 close to the first base substrate 10, or may be arranged on a side of the organic material functional layer 30 away from the first base substrate 10.

On such basis, a material of the pressure-sensitive electrode 50 is not limited, and a transparent conductive material such as ITO may be used, or an opaque metal material such as molybdenum, aluminum, silver or the like may be used, which may be determined according to specific position thereof. If the pressure-sensitive electrode 50 is arranged on a light-outgoing side of the display panel 02, it should be ensured that the pressure-sensitive electrode 50 is made of a transparent conductive material; if the pressure-sensitive electrode 50 is arranged on a non-light-outgoing side of the display panel 02, the pressure-sensitive electrode 50 may be made of a transparent conductive material or a metal material.

In addition, since the pressure-sensitive electrode 50 cannot exist alone, and there is a gap 60 between the pressure-sensitive electrode 50 and the display panel 02, it must be carried on a corresponding carrying substrate (not illustrated in FIGS. 1a and 1b or FIGS. 2a and 2b). On such basis, the carrying substrate for carrying the pressure-sensitive electrode 50 is not limited by the embodiment of the present disclosure, which may be an inherent structure of the display device 01 other than the display panel 02, or may be an additional structure.

On such basis, a fixing mode between the carrying substrate for carrying the pressure-sensitive electrode 50 and the display panel 02 is not limited, as long as a gap 60 is formed between the pressure-sensitive electrode 50 and the display panel 02.

When the pressure-sensitive electrode 50 is arranged on a light-outgoing side of the display panel 02, it is necessary to ensure that the carrying substrate described above is transparent, too.

Thirdly, a width of the gap 60 between the pressure-sensitive electrode 50 and the display panel 02 is not limited, as long as the width of the gap 60 can be changed when a certain pressure is applied thereto. The width referred to herein is a width in a direction perpendicular to the display device 01.

Fourthly, any one of the pressure-sensitive electrodes 50 may correspond to the first electrodes 20 of a plurality of sub-pixel units.

The correspondence here is that, there is an overlapping area between the projection of the pressure-sensitive electrode 50 and projections of the first electrodes 20 of the plurality of sub-pixel units on the first substrate 10.

In the embodiment of the present disclosure, the first electrodes 20 of the plurality of sub-pixel units corresponding to the pressure-sensitive electrode 50 may partially overlap with the pressure-sensitive electrode 50, or may fully overlap with the pressure-sensitive electrode 50, as long as there is an overlapping area therebetween.

The embodiment of the present disclosure provides a display device 01 having a pressure-sensitive function, by arranging a pressure-sensitive electrode 50 on a side of a first electrode 20 away from an organic material functional layer 30, a capacitance may be formed between the pressure-sensitive electrode 50 and the first electrode 20; when the display device 01 is pressed by a finger, since a width of a gap 60 between the pressure-sensitive electrode 50 and the display panel 02 is changed, a distance between the pressure-sensitive electrode 50 and the display panel 02 is also changed, and further a capacitance value between the pressure-sensitive electrode 50 and the first electrode 20 is changed, and a corresponding pressure value may be obtained according to the capacitance value, so that a touch function corresponding to the pressure value may be realized. On such basis, the pressure value can correspond to the capacitance value, and the pressure value can correspond to the touch function in the present disclosure, so that a function of identifying a variety of pressures can be realized according to demands. Since the pressure-sensitive electrode 50 may be arranged in an entire region of the display panel, a problem of pressure-sensitive blind spots in a large-sized display device 01 is solved. In addition, since a capacitance is formed between the pressure-sensitive electrode 50 and the first electrode 20 owned by the display panel 02, a preparation process of the display device 01 may be simplified.

Figure 3:
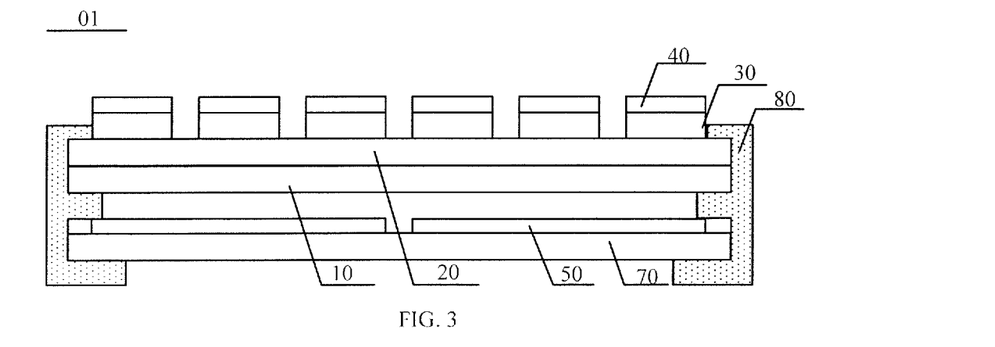
FIG. 3 is a structural schematic diagram of yet another display device having a pressure-sensitive function provided by an embodiment of the present disclosure.

In some examples, the pressure-sensitive electrode 50 may be arranged on an additional carrying substrate, i.e., as illustrated in FIG. 3, the pressure-sensitive electrode 50 may be arranged on a second base substrate 70, and on such basis, the display panel 02 and the second base substrate 70 where the pressure-sensitive electrode 50 has been arranged are fixed by a frame 80.

The frame 80 may have a protruding portion, and the protruding portion is used for placing the display panel 02 and/or the second base substrate 70.

It should be noted that, a structure of the frame 80 is not limited, as long as the display panel 02 and the second base substrate 70 can be fixed. In addition, a material of the frame 80 is not limited, for example, the frame may be made of polycarbonate.

In the embodiment of the present disclosure, in one aspect, by arranging the pressure-sensitive electrode 50 on the second base substrate 70, a material and a thickness of the second base substrate 70 may be selected according to demands, and in another aspect, since it is relatively easy to make the frame 80 have structures of various shapes, the structure of the frame 80 may be easily configured according to a width of a gap 60 between the display panel 02 and the pressure-sensitive electrode 50 on the second base substrate 70, so as to support the display panel 02 and the second base substrate 70. In addition, the frame 80 can also play a role of engaging the display panel 02 and the second base substrate 70.

In some examples, the display device 01 further comprises a metal back cover; and the second base substrate 70 where the pressure-sensitive electrode 50 has been arranged is arranged between the metal back cover and the display panel 02.

In the embodiment of the present disclosure, as compared with arranging the pressure-sensitive electrode 50 on a light-outgoing side of the display device 01, the pressure-sensitive electrode 50 is arranged on a non-light-outgoing side, so as to avoid influence on display.

In some examples, the pressure-sensitive electrode 50 is made of a metal material.

The pressure-sensitive electrode 50 may be specifically made of a metal material such as aluminum, molybdenum, silver or the like.

In the embodiment of the present disclosure, since a resistance of the metal material is low, when the pressure-sensitive electrode 50 is made of the metal material, it has high touch sensitivity.

In some examples, the first electrode 20 is non-transparent; and the second electrode 40 is semi-transparent.

The first electrode 20 is made of a metal material, and is thick; and the second electrode 40 is made of a metal material, and is thin. The metal material may be silver, aluminum, molybdenum or the like.

When the first electrode 20 is non-transparent, the second electrode 40 is semi-transparent, the non-transparent first electrode 20, the organic material functional layer 30, and the semi-transparent second electrode 40 may form a micro cavity, and an output efficiency of light may be further improved by a light interference effect in the micro cavity.

In some examples, the gap is filled with a fluid or an elastic material.

In some examples, the pressure-sensitive electrode includes a plurality of sub pressure-sensitive electrodes (e.g., parts indicated by a rectangle box of reference number 50 in FIG. 2a), and each sub pressure-sensitive electrode corresponds to a plurality of sub-pixel units in the display panel.

In some examples, a capacitor is formed by each sub pressure-sensitive electrode and the first electrode.

Figure 4:
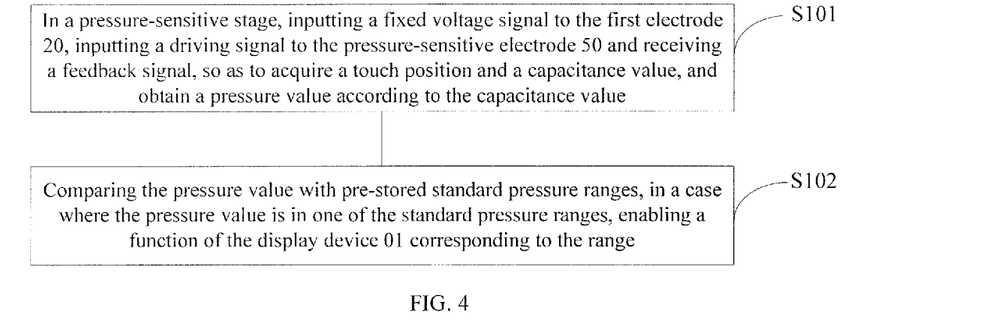
FIG. 4 is a flowchart of a driving method of a display device having a pressure-sensitive function provided by an embodiment of the present disclosure.

An embodiment of the present disclosure further provides a driving method of the display device 01, and as illustrated in FIG. 4, the driving method comprises steps S101 and S102.

S101: in a pressure-sensitive stage, inputting a fixed voltage signal to the first electrode 20, inputting a driving signal to the pressure-sensitive electrode 50 and receiving a feedback signal, so as to acquire a touch position and a capacitance value, and obtain a pressure value according to the capacitance value.

For example, a fixed voltage signal may be input to the first electrode 20 by a first driving IC connected with the first electrode 20, a driving signal may be input to the pressure-sensitive electrode 50 by a second driving IC connected with the pressure-sensitive electrode 50, and a feedback signal may be received by the second driving IC. The first driving IC and the second driving IC may be a same driving IC, or may be different driving ICs.

It should be noted that, a size of the input fixed voltage signal is not limited, which may be appropriately determined according to a voltage required by a touch in practical application. In addition, there is a one-to-one corresponding relationship between the capacitance value and the pressure value, and the one-to-one corresponding relationship may be predetermined.

S102: comparing the pressure value with pre-stored standard pressure ranges, in a case where the pressure value is in one of the standard pressure ranges, enabling a function of the display device 01 corresponding to the range.

For example, the function of the display device corresponding to the range which is enabled here may be configured arbitrarily, and for example, it may be an operation of opening a program, etc.

A standard pressure range may correspond to a function of the display device 01, and therefore, a plurality of standard pressure ranges may be determined according to specific functions, and the corresponding relationship may be predetermined.

Here, the function of the display device 01 corresponding to the standard pressure range is not limited, and the corresponding function may be determined according to demands of the display device 01. The pressure value obtained in step S101 is compared with the pre-stored standard pressure ranges, and if the pressure value is in one of the standard pressure ranges, a function corresponding to the range is realized. For example, in the standard pressure range, when the pressure is 0.003 to 0.005 N, the corresponding function is enabled, and if the pressure value obtained in step S101 is 0.0035 N, the function will be enabled.

On such basis, step S101 may be implemented in two manners:

A first manner: in a pressure-sensitive stage, the first driving IC inputs a fixed voltage signal to the first electrode 20, the second driving IC inputs a driving signal to the pressure-sensitive electrode 50 and receives a feedback signal, so as to acquire a touch position, and a capacitance value between the pressure-sensitive electrode 50 and the first electrode 20 in the touch position; and the second driving IC obtains a pressure value corresponding to the capacitance value in the touch position according to a time of a standard capacitance value changing to the capacitance value; wherein, the time of the standard capacitance value changing to the capacitance value is in a one to one correspondence with the pressure value; and the standard capacitance value is a capacitance value between the pressure-sensitive electrode 50 and the first electrode 20 when there is no touch.

In the pressure-sensitive stage, if there is a touch, a distance between the pressure-sensitive electrode 50 and the first electrode 20 will be reduced, and on such basis, according to an actual distance between the pressure-sensitive electrode 50 and the first electrode 20, a capacitance value between the pressure-sensitive electrode 50 and the first electrode 20 in the touch position may be calculated by using the parallel plate capacitance formula described above.

Figure 5:
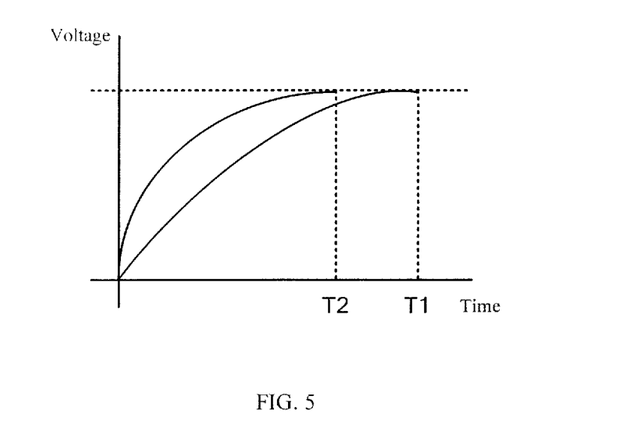
FIG. 5 is a schematic diagram of a corresponding relationship between charging times and voltage values provided by an embodiment of the present disclosure.

The one-to-one corresponding relationship between the time of the standard capacitance value changing to the capacitance value between the pressure-sensitive electrode 50 and the first electrode 20 after there is a touch may be pre-stored in the second driving IC. As illustrated in FIG. 5, in a pressure-sensitive stage, when the display device 01 is touched with a small force, the distance between the pressure-sensitive electrode 50 and the first electrode 20 is reduced by a small amount, and the capacitance value between the pressure-sensitive electrode 50 and the first electrode 20 is increased by a small amount, so that a time of T2 is taken to complete charging and reach a corresponding voltage. When the display device 01 is touched with a large force, the distance between the pressure-sensitive electrode 50 and the first electrode 20 is reduced by a large amount, and the capacitance value between the pressure-sensitive electrode 50 and the first electrode 20 is increased by a large amount, so that a time of T1 is taken to complete charging and reach a corresponding voltage. On such basis, a corresponding pressure value may be obtained according to a length of charging time.

Here, the pressure value corresponding to the time of the standard capacitance value changing to the capacitance value between the pressure-sensitive electrode 50 and the first electrode 20 after there is a touch may be a range, and is not limited to a point value. Similarly, the time of the standard capacitance value changing to the capacitance value between the pressure-sensitive electrode 50 and the first electrode 20 corresponding to the pressure value may also be a range.

That is to say, in some examples, a time of the pressure-sensitive electrode in the touch position reaching a predetermined voltage value may be obtained in a pressure-sensitive stage (as illustrated in FIG. 5); and the pressure value may be obtained according to the time; wherein, the time is in a one to one correspondence with the pressure value. The predetermined voltage value is not particularly limited and may be selected according to actual situations. For example, the predetermined voltage value may be greater than an initial voltage of the pressure-sensitive electrode, or may be less than an initial voltage of the pressure-sensitive electrode.

For example, since changes in the capacitance value between the pressure-sensitive electrode and the first electrode are different due to different pressures in the touch stage. The different capacitance values mean that charging amounts required for a voltage reaching a predetermined voltage value are different, thereby affecting charging time.

A second manner: in a pressure-sensitive stage, the first driving IC inputs a fixed voltage signal to the first electrode 20, the second driving IC inputs a driving signal to the pressure-sensitive electrode 50 and receives a feedback signal, so as to acquire a touch position, and a voltage value of the pressure-sensitive electrode 50 in the touch position when a predetermined time is up; and a pressure value is obtained according to the voltage value; wherein, the voltage value is in a one to one correspondence with the pressure value.

Figure 6:
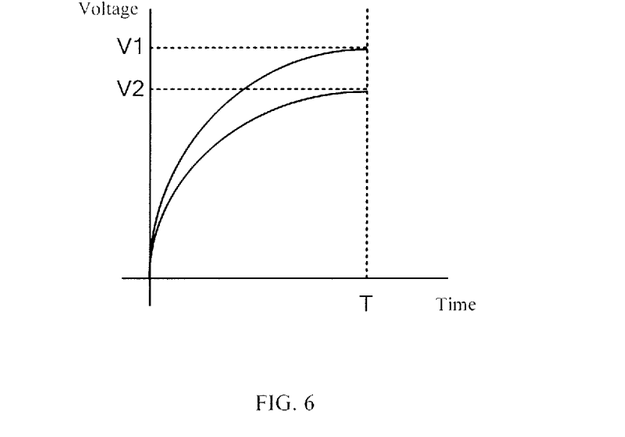
FIG. 6 is a schematic diagram of another corresponding relationship between charging times and voltage values provided by an embodiment of the present disclosure.

The one-to-one corresponding relationship between the voltage value and the pressure value may be pre-stored in the second driving IC. Wherein, as illustrated in FIG. 6, when the display device 01 is touched with a small force, the capacitance value between the pressure-sensitive electrode 50 and the first electrode 20 is increased by a small amount, and a capacitance saturation value thereof is small, when a predetermined time T is up, the voltage of the pressure-sensitive electrode 50 may get to V1. When the display device 01 is touched with a large force, the capacitance value between the pressure-sensitive electrode 50 and the first electrode 20 is increased by a large amount, and a capacitance saturation value thereof is large, when a predetermined time T is up, the voltage of the pressure-sensitive electrode 50 may only get to V2. On such basis, a corresponding pressure value may be obtained according to the voltage value when the predetermined time T is up.

It is to be noted that, the voltage value of the pressure-sensitive electrode 50 in the touch position when the predetermined time is up may be obtained according to the capacitance value between the pressure-sensitive electrode 50 and the first electrode 20 in the touch position when the predetermined time is up.

In addition, the predetermined time is not limited, and may be reasonably determined according to a time required for changes in the capacitance in actual touch.

Based on the above, the driving method further comprises inputting a data signal to the second electrode 40 in a display stage.

The data signal may be input to the second electrode 40 by a third driving IC, and the third driving IC may be an IC different from the first driving IC.

Since the first driving IC inputs a fixed voltage value to the first electrode 20, when the third driving IC inputs different data signals to the second electrode 40, different display images may be realized.

In some examples, the display stage and the pressure-sensitive stage are of a same time period.

Here, since a fixed voltage value may be input to the first electrode 20 whether in the display stage or the pressure-sensitive stage, when the display stage and the pressure-sensitive stage are of a same time period, a voltage for realizing both display and touch may be input to the first electrode 20, and on such basis, corresponding signals may be respectively input to the second electrode 40 and the pressure-sensitive electrode 50, so as to realize display and touch functions at the same time, and thus user experience is improved.

The foregoing embodiments merely are exemplary embodiments of the disclosure, and not intended to define the scope of the present disclosure, and the scope of the present disclosure is determined by the appended claims.

The present application claims priority of Chinese Patent Application No. 201510758107.7 filed on Nov. 9, 2015, the present disclosure of which is incorporated herein by reference in its entirety as part of the present application.

The invention claimed is:

1. A display device having a pressure-sensitive touch function, comprising a display panel and a pressure-sensitive electrode, the display panel including a first electrode, a second electrode and an organic material functional layer located between the first electrode and the second electrode, which are arranged on a first base substrate, wherein,
the pressure-sensitive electrode is arranged on a side of the first electrode away from the organic material functional layer, and there is a gap between the pressure-sensitive electrode and the display panel; and
there is an overlapping area between a projection of the pressure-sensitive electrode and a projection of the first electrode on the first base substrate,
wherein, the display device further comprises a driving device configured for:
in a pressure-sensitive stage, inputting a fixed voltage signal to the first electrode, inputting a driving signal to the pressure-sensitive electrode and receiving a feedback signal from the pressure-sensitive electrode, so as to acquire a touch position and a capacitance value, and obtain a pressure value according to the capacitance value;
comparing the pressure value with pre-stored standard pressure ranges, in a case where the pressure value is in one of the standard pressure ranges, enabling a function of the display device corresponding to the range;
wherein, in the pressure-sensitive stage, inputting the driving signal to the pressure-sensitive electrode and receiving the feedback signal from the pressure-sensitive electrode, so as to acquire the touch position and the capacitance value, and obtain the pressure value according to the capacitance value, includes:
in the pressure-sensitive stage, inputting the driving signal to the pressure-sensitive electrode and receiving the feedback signal from the pressure-sensitive electrode, so as to acquire the touch position, and a voltage value of the pressure-sensitive electrode in the touch position when a predetermined time is up;
obtaining the pressure value according to the voltage value;
wherein, the voltage value is in a one to one correspondence with the pressure value.

2. The display device according to claim 1, wherein, the pressure-sensitive electrode is arranged on a second base substrate;
the display panel and the second base substrate where the pressure-sensitive electrode has been arranged are fixed by a frame.

3. The display device according to claim 2, wherein, the display device further comprises a metal back cover;
the second base substrate where the pressure-sensitive electrode has been arranged is arranged between the metal back cover and the display panel.

4. The display device according to claim 2, wherein, pressure-sensitive electrode is made of a metal material.

5. The display device according to claim 2, wherein, the first electrode is non-transparent, and the second electrode is semi-transparent.

6. The display device according to claim 2, wherein, the gap is filled with a fluid or an elastic material.

7. The display device according to claim 2, wherein, the pressure-sensitive electrode includes a plurality of sub pressure-sensitive electrodes, each sub pressure-sensitive electrode is opposed to a plurality of sub-pixel units in the display panel.

8. The display device according to claim 3, wherein, the first electrode is non-transparent, and the second electrode is semi-transparent.

9. The display device according to claim 3, wherein, the gap is filled with a fluid or an elastic material.

10. The display device according to claim 3, wherein, the pressure-sensitive electrode includes a plurality of sub pressure-sensitive electrodes, each sub pressure-sensitive electrode is opposed to a plurality of sub-pixel units in the display panel.

11. The display device according to claim 1, wherein, the pressure-sensitive electrode is made of a metal material.

12. The display device according to claim 1, wherein, the first electrode is non-transparent, and the second electrode is semi-transparent.

13. The display device according to claim 1, wherein, the gap is filled with a fluid or an elastic material.

14. The display device according to claim 1, wherein, the pressure-sensitive electrode includes a plurality of sub pressure-sensitive electrodes, each sub pressure-sensitive electrode is opposed to a plurality of sub-pixel units in the display panel.

15. The display device according to claim 14, wherein, a capacitor is formed by each sub pressure-sensitive electrode and the first electrode.

16. A driving method of the display device according to claim 1, comprising:
in a pressure-sensitive stage, inputting a fixed voltage signal to the first electrode, inputting a driving signal to the pressure-sensitive electrode and receiving a feedback signal from the pressure-sensitive electrode, so as to acquire a touch position and a capacitance value, and obtain a pressure value according to the capacitance value;
comparing the pressure value with pre-stored standard pressure ranges, in a case where the pressure value is in one of the standard pressure ranges, enabling a function of the display device corresponding to the range,
wherein, in the pressure-sensitive stage, inputting the driving signal to the pressure-sensitive electrode and receiving the feedback signal from the pressure-sensitive electrode, so as to acquire the touch position and the capacitance value, and obtain the pressure value according to the capacitance value, includes:
in the pressure-sensitive stage, inputting the driving signal to the pressure-sensitive electrode and receiving the feedback signal from the pressure-sensitive electrode, so as to acquire the touch position, and a voltage value of the pressure-sensitive electrode in the touch position when a predetermined time is up;
obtaining the pressure value according to the voltage value;
wherein, the voltage value is in a one to one correspondence with the pressure value.

17. The driving method according to claim 16, wherein, the driving method further comprises:

in a display stage, inputting a data signal to the second electrode.

18. The driving method according to claim 17, wherein, the display stage and the pressure touch stage are of a same time period.

* * * * *